Dec. 9, 1969     M. L. BREWSTER     3,482,326
FREEZE DRYING PROCESS
Filed May 19, 1967
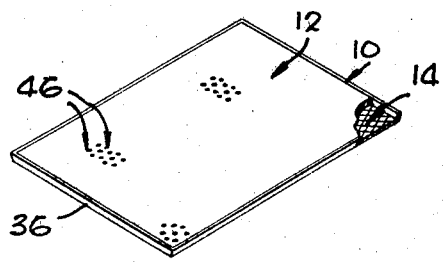
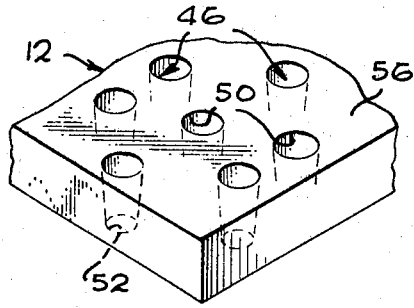
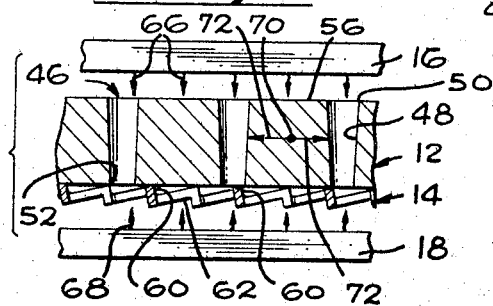
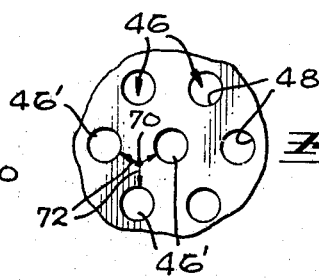
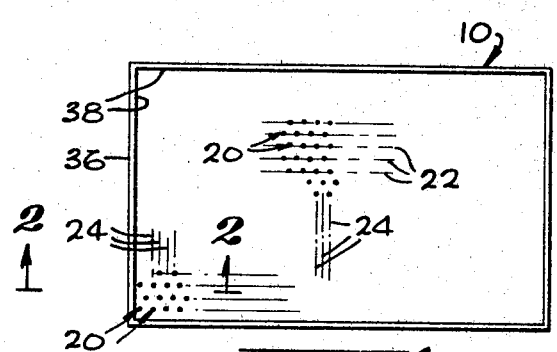
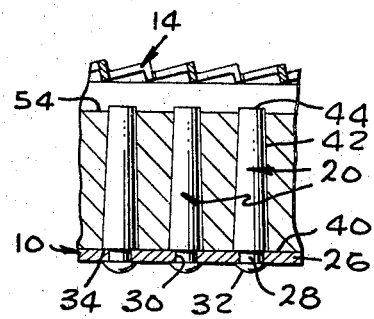
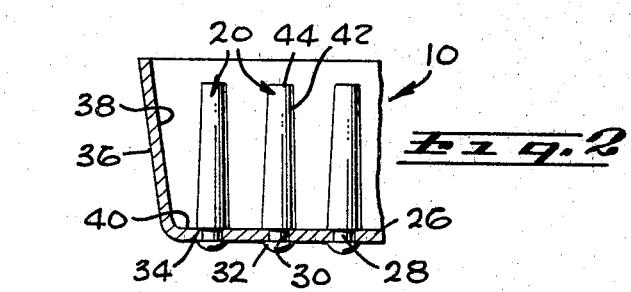
MARSHALL L. BREWSTER
INVENTOR.
BY Allan M. Shapiro
ATTORNEY United States Patent Office 3,482,326
Patented Dec. 9, 1969

3,482,326
FREEZE DRYING PROCESS
Marshall L. Brewster, 7121 Candy Ave.,
Reseda, Calif. 91355
Filed May 19, 1967, Ser. No. 639,816
Int. Cl. F25c 1/24; F26b 5/06
U.S. Cl. 34—5        5 Claims

ABSTRACT OF THE DISCLOSURE

Perforated slab of frozen product for dehydration in a vacuum drying process. Perforations provide greatly increased vapor path area and decreased vapor path travel, the latter being as much or more in the lateral direction as normal to the upper and lower slab surfaces. A freezing tray having a plurality of upright pins for forming such perforations in situ. A process for forming such perforations in situ as the product is frozen into the slab form.

BACKGROUND OF THE INVENTION

Field of the invention

In vacuum drying a frozen food, beverage, liquid or other product material with radiant heat, the speed and efficiency of drying are generally proportional to the amount of surface area exposed to the heat flux which travels essentially in a straight line. Therefore, an increase in the surface area of a given volume of frozen material should normally cause a proportionate decrease in the drying time. However, considering the straight line characteristics of the heat flux, an increase in the surface area does not necessarily cause a corresponding increase in the drying efficiency unless the configuration of the frozen material is such as to be conducive to the reception and absorption of the radiant heat. Thus, the manner of organization of the surface and configuration of the frozen material must be such as to assure maximum surface area exposure in the path of the radiant heat flux, such manner of surface organization being the field of the present invention.

Description of the prior art

There have been numerous attempts in the past to improve upon the broad flat surface of frozen materials in order to attain a more propitious surface area exposure. Such attempts have included cracking or crazing the frozen slab to expose an increased surface area, or cutting or breaking the slap into pieces, or literally crushing the frozen mass into a crushed ice state, but such methods only present a conglomerate and radically irregular surface exposed to the radiant heat flux such as to result in an uneven heat distribution pattern, causing irregularity in the texture of the final dried product as well as a non-uniformly dry product both during and at the conclusion of the drying process, with corresponding hazards of susceptibility to harmful biochemical effects as well as the numerous other problems related to non-uniformity in drying as are well known to those skilled in the art.

Another problem to which the present invention is directed relates to the vapor emissivity characteristics of a frozen slab of material during vacuum drying thereof, such characteristics being somewhat related but not directly proportional to the problems of radiant heat surface absorptivity previously described. While the past methods previously described for increasing heat absorption surface area also improve the VPA (vapor path area), such increases are non-uniform and, accordingly, undesirable.

SUMMARY OF THE INVENTION

Accordingly, the principal object of the present invention include the provision of means and methods for increasing the surface of a frozen slab of material for improving the rates of both heat absorption and vapor emission in a vacuum drying process.

Another object of the present invention is the provision of a means and method for obtaining a slab of frozen product for vacuum drying thereof wherein the slab may have increased physical thickness but effectively reduced thickness insofar as the VPT (vapor path travel) is concerned so as to reduce the VPT to the shortest practicable distance and in a uniform manner for maximized escape of the vapor from through the interior of the frozen slab.

Another object of the present invention is the provision of a means and method for obtaining a slab of frozen product for vacuum drying thereof whereby the effective distance for penetration of the radiant heat to the ice core is reduced in a manner effectively independent of the physical thickness of the slab.

Another object of the present invention is the provision of a means and method for obtaining a slab of frozen product for vacuum drying thereof whereby heavier loading of material for a given area of drying tray is attained, thereby increasing productivity.

An important object of the present invention is the provision of a means and method for obtaining a slab of frozen product for vacuum drying thereof whereby the total drying time for a given volume of frozen material is reduced without loss of physical or biochemical qualities.

In accordance with the present invention, there is provided a freezing tray having a large plurality of pins secured to the bottom thereof and projecting vertically upwardly therefrom in a uniform pattern, preferably in staggered rows and columns. The material to be frozen is poured or otherwise disposed into the tray and thereupon quick frozen, thereby producing a frozen slab of material with the plurality of pins projecting completely therethrough. In a preferred embodiment, the pins are tapered and Teflon coated to facilitate release of the frozen slab. The side walls of the tray are sloped slightly outwardly to similarly facilitate release of the frozen slab.

Release of the frozen slab from the freezing tray is accomplished by merely turning the tray over, preferably directly upon a drying tray for transfer thereto, whereby the previously upper surface of the frozen slab becomes the bottom surface thereof, and vice versa. Thus, the frozen slab as it rests upon the drying tray has the same plurality of holes as the number of pins in the freezing tray, such holes having the same configuration as that of the pins albeit vertically reversed or inverted. Thus, with the preferred tapered configuration of the pins, the holes are similarly tapered and constitute basically vertical passages having top and bottom apertures, the top apertures being larger than the bottom apertures. The drying tray is preferably of an expanded metal construction to provide maximum open area for the absorption of heat from radiant heating platens disposed both above and below the drying tray, as well as to maximize the VPA and minimize the VPT.

Since the walls of the frozen slab defining the holes therethrough constitute surfaces of the frozen slab, the aggregate surface area of the slab is greatly increased over the normal surface presented by a solid slab. Such increased surface area simultaneously attains correspondingly improved characteristics of both radiant heat absorptivity and also vapor emissivity. The uniform pattern distribution of the holes provides an effectively uniform thickness for the frozen material as viewed in the lateral or horizontal direction, as though the frozen material were literally standing on end, thus laterally exposing the same proportion of surface area for any given laterally-thick unit of mass independent of the vertical thickness of the slab, whereby the physically vertical thickness or depth of the frozen slab may be greater than otherwise practicable.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIGURE 1 is a top plan view of a freezing tray in accordance with the present invention;

FIGURE 2 is an enlarged fragmentary sectional view, partly in elevation, as seen substantially along line 2—2 in FIGURE 1, showing the perforation-creating pins;

FIGURE 3 is a sectional view, similar in aspect to FIGURE 2, showing the frozen product slab on the freezing tray and indicating the drying tray disposed thereabove preparatory to transfer of the frozen product slab from the freezing tray to the drying tray;

FIGURE 4 is a fragmentary perspective view of the perforated frozen product slab in accordance with the present invention;

FIGURE 5 is a reduced size perspective view of the frozen product slab disposed upon the drying tray, portions being broken away and diagrammatically illustrated for convenience;

FIGURE 6 is a fragmentary vertically sectioned view, partly in elevation, of the frozen slab on the drying tray, disposed between radiant heating platens as in a vacuum drying chamber; and FIGURE 7 is a fragmentary top plan view of the frozen product slab illustrating the vapor path pattern.

DESCRIPTION OF THE PREFERRED EMBODIMENTS

Referring to the drawings, there is seen a freezing tray 10 for receiving and retaining a liquid product for freezing thereof and having a rectangular configuration with suitable dimensions for use in conventional blast freezers whereby a slab 12 of frozen product is obtained for transfer to a drying tray 14 of similarly suitable overall dimensions in accordance with the dimensions and spacings involved in conventional vacuum drying equipment, as between radiant heating platens 16 and 18, for example, which are representative of a stacked series of such spaced elements in a vacuum drying chamber.

Referring to FIGURES 1 and 2, the freezing tray 10, in accordance with the present invention, is provided with a plurality of vertical pins 20 of identical configuration and arranged in a uniform pattern preferably comprising staggered rows and columns, indicated generally by broken lines at 22 and 24, respectively, wherein the individual pins 20 are equally spaced from each other, i.e., each pin 20 is circular in horizontal cross section and its axial center is equidistant from the axial centers of each adjacent pin, the reasons for which will be explained more fully hereinafter. Each pin 20 is secured in an upright position to the bottom plate 26 of the tray 10 as by the illustrated reduced-diameter shank portion 28 extending through a hole 30 in the plate 26 and having an upset or swaged head 32; it is clear that the pin 20 may be secured to plate 26 by any other convenient means as well, such as, for example, a round or flat head machine screw threadably inserted through the bottom surface 34 of the pin 20 into a threaded hole therein, a threaded shank extending through the hole 30 from the pin body and provided with a nut thereon, and so forth.

Preferably, the tray sidewalls 36 are upwardly outwardly sloped, and their interior surfaces 38, as well as the interior surface 40 of the bottom plate 26 and lateral surface 42 of pins 20, preferably are coated with Teflon or a similar insert material to minimize binding or sticking of the frozen product slab 12 thereto whereby the slab 12 may be transferred therefrom by virtue of its weight alone when the freezing tray 10 is turned over upon the drying tray 14. Partially for the same reason of preventing binding or sticking during slab transfer, each pin 20 is tapered upwardly inwardly from its body bottom extremity 34 to its upper extremity 44, a more important reason therefor being explained more fully hereinafter.

Referring to FIGURE 3, it is obvious that a liquid product has been poured into the tray 10 to a level below that of the upper pin extremity 44 and quick-frozen in situ to provide the frozen product slab 12 within the freezing tray 10. Preferably, the drying tray 14 is then disposed upside-down upon the slab 12 and freezing tray 10 and then such assembly is inverted to rest upon the drying tray 14. Mere lifting of the freezing tray 10 then is normally sufficient to cause gravitational release and transfer of the frozen slab 12 from the freezing tray 10 to the drying tray 14 as an integral slab 12 (see FIGURE 5); if necessary, a slight tapping on the freezing tray 10 aids such release and transfer.

Referring to FIGURES 4–7, the frozen product slab 12, shown in its inverted position after transfer to the drying tray 14, is seen to have a unitary and uniformly thick structure and is provided with a plurality of perforations or passages 46 extending therethrough, the number of such passages 46 corresponding to the number of forming pins 20 in the freezing tray 10, the length or height of such passages being substantially the same as the height of the tray-interior body of the pins 20, each passage 46 being defined by a frusto-conical wall 48 in the slab 12. By virtue of the inversion of the slab 12 from the freezing tray 10, the tapered walls 48 are tapered upwardly outwardly whereby the upper passage edge 50 has a greater diameter than the lower passage edge 52, the diameter of upper edge 50 corresponding to the diameter of pin body bottom 34 while the diameter of the lower edge 52 is the same as diameter of the forming pin 20 at whatever level the now-lower surface of the slab 12 (previously upper surface 54, in FIGURE 3) intersected the pins 20. Of course, the upper surface 56 of slab 12 corresponds to the previously-lower surface 56 in FIGURE 3.

Referring to FIGURES 5 and 6, the drying tray 14 is constructed of one of many standard types of expanded-metal sheets having various configurations and shapes in both plan and sectional views, the one illustrated having essentially diamond shaped openings offering approximately 65% to 80% open area in plan view. Preferabaly, as illustrated in FIGURE 6, the configuration in section is such that the metal intersections 60 are effectively high points upon which the lower slab surface 54 rests, with the metallic portions 62 interconnecting such junctions being sloped so as to be spaced from the slab surface 54. Thus, only an extremely minor portion of the slab surface 54 is actually in contact with the drying tray 14.

Referring to FIGURE 6, the drying tray 14 and frozen slab 12 are suspended conventionally between opposed radiant heating platens 16 and 18 which emit heat flux indicated respectively by wavy lines 66 and 68 toward upper and lower slab surfaces 56 and 54, respectively. Heat flux 66 and 68 impinge upon respective upper and lower slab surfaces 56 and 54 and cause sublimation of ice contained in slab 12 in a conventional manner, the tray 14 imposing no significant barrier to heat flux 68 as the latter passes through tray 14 in either a radiant mode through the open spaces or conduction mode through the metal. However, in accordance with the present invention, a substantial portion of heat flux 66 and 68 enter perforations 46 and are absorbed by the slab 12 through its passage-defining interior walls 48. While the cross-sectional area of the holes 46 diminishes the exposed surface area of the slab 12 at surfaces 56 and 54, the height-to-diameter ratio of the slab's interior walls 48 is such that the surface area of interior walls 48 is much greater than the lost surface represented by holes 46 and, accordingly, the total available surface area for the slab 12 is greatly increased for a faster rate of heat flux absorption. Further, the concomitant feature of greatly increased VPA occurs as vapor evolves from the slab 12 from the progressively diminishing ice core within the slab 12 toward all surfaces 48, 54 and 56. Still further, as more clearly seen in conjunction with the preferred hole arrangement shown in FIGURE 7, the VPT of any given ice particle, as diagrammatically indicated at 70, is over the shortest possible distance, as indicated by arrows 72. Thus, in effect, each portion of the slab 12 residing between triangularly adjacent holes, as indicated at 46', constitutes an effectively separate portion of frozen product being subjected to radiant heat in all directions, has a maximum VPA for both radiant heat absorption and vapor emission, and has the shortest possible VPT to available surfaces 48, 54 and/or 56; due to the large ratio of vertical height to horizontal thickness of such portion, it is effectively standing on end and thus resides in a 90° deviation attitude or orientation from the normal frozen product orientation relative to heating platens 16 and 18.

As seen in FIGURE 7, the preferred pattern arrangement of the holes or perforations 46 (and therefore of the pins 20) is such that the hole centers are located at the apices of equilateral triangles, such triangles preferably having ½" sides, i.e., the center of each hole or pin is spaced ½" from the center of its six nearest adjacent holes or pins, such uniform pattern being most easily obtained by the staggered rows and columns 22 and 24 previously indicated. With such preferred pattern and spacing, pins 20 preferably are at least 1" high and have diameters of about 5/16" and ⅛" at ends 34 and 44, respectively.

The slope of slab interior walls 48 provides both increased surface area compared to straight cylindrical walls, a flux trap for heat flux 66 entering through the larger end 50, and an expanding vapor port through end 50 for emission of the evolving vapor.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:
1. In a process for vacuum drying products containing water in which the product to be dried is frozen into a slab and thereafter subjected to vacuum drying while supplying heat to the slab to sublimate the ice, the improvement comprising:
freezing the water-containing product in a mold tray shaped to provide a frozen slab having parallel top and bottom surfaces and a plurality of aperture surfaces disposed in a uniform pattern, each of said aperture surfaces defining a tapered passageway through said slab communicating between said top and bottom surfaces whereby said aperture surfaces receive a portion of such heat energy and constitute sublimation surfaces and whereby said passageways constitute vapor paths.
2. The invention as defined in claim 1 wherein:
each of said aperture surfaces has a truncated cone shape, the vertical axis thereof being the center of said passageway.
3. The invention as defined in claim 2 wherein:
said uniform pattern consists of staggered rows and colums.
4. The invention as defined in claim 3 wherein:
said uniform pattern is in accordance with an imaginary horizontal grid of equilateral triangles, said passageway centers being located at the apices of said triangles whereby the lateral vapor paths through said slab to said aperture surfaces are substantially uniform.
5. The invention as defined in claim 4 wherein:
said passageway centers are spaced approximately one-half inch apart.

References Cited

UNITED STATES PATENTS

| | | | |
|---|---|---|---|
| 2,284,848 | 6/1942 | Ryan | 34—5 X |
| 3,358,379 | 12/1967 | Coley | 34—5 |
| 817,008 | 4/1906 | Schoeneman | 249—64 |
| 1,031,334 | 7/1912 | Feldkamp | 249—60 |
| 2,930,139 | 3/1960 | Brynko et al. | 34—5 |
| 3,170,308 | 2/1965 | Cucuzza | 62—320 |
| 3,289,314 | 12/1966 | Porta | 34—5 X |
| 3,321,932 | 5/1967 | Orphey | 62—340 |
| 3,328,847 | 7/1967 | Trogdon | 249—176 |
| 3,358,379 | 12/1967 | Coley | 34—5 |

WILLIAM E. WAYNER, Primary Examiner

U.S. Cl. X.R.

34—237; 62—1; 249—176